United States Patent
Kroman

(10) Patent No.: US 6,948,811 B2
(45) Date of Patent: Sep. 27, 2005

(54) EYEGLASS FRAME, A HINGE, AN EYEGLASS AND A METHOD OF MANUFACTURING A HINGE

(75) Inventor: Flemming Kroman, Brabrand (DK)

(73) Assignee: Lindberg A/S, Åbyhøj (DK)

( * ) Notice: Subject to any disclaimer, the term of this patent is extended or adjusted under 35 U.S.C. 154(b) by 0 days.

(21) Appl. No.: 10/476,087

(22) PCT Filed: Apr. 27, 2001

(86) PCT No.: PCT/DK01/00285

§ 371 (c)(1),
(2), (4) Date: Oct. 27, 2003

(87) PCT Pub. No.: WO02/088827

PCT Pub. Date: Nov. 7, 2002

(65) Prior Publication Data

US 2004/0119937 A1 Jun. 24, 2004

(51) Int. Cl.[7] .................................................. G02C 5/22
(52) U.S. Cl. ......................................... 351/153; 16/228
(58) Field of Search ................................ 351/153, 110, 351/111, 113, 114, 41; 16/228

(56) References Cited

U.S. PATENT DOCUMENTS

| 5,684,559 A | 11/1997 | Lin | |
|---|---|---|---|
| 5,880,807 A | * 3/1999 | Devercelli | 351/106 |
| 5,903,332 A | * 5/1999 | Devercelli | 351/153 |

FOREIGN PATENT DOCUMENTS

| WO | WO 97/23803 | 7/1997 |
|---|---|---|
| WO | WO 98/40778 | 9/1998 |

* cited by examiner

Primary Examiner—Hung Xuan Dang
(74) Attorney, Agent, or Firm—James Creighton Wray; Meera P. Narasimhan

(57) ABSTRACT

An eyeglass frame comprises a frame front, a pair of temple bars and a hinge for each temple bar to provide a pivotal connection. The hinge comprises a coil winding of a resilient wire integral with the temple bar and a body with a threaded groove integral with the other one of the frame front or temple bar. The body comprises friction material and the coil is adapted for cooperating and pretensioned engagement with the body in order to provide a pivotal connection with a controlled friction resistance to turning of the pivot. The invention a so provides a hinge, an eyeglass and a method of manufacturing a hinge.

16 Claims, 4 Drawing Sheets

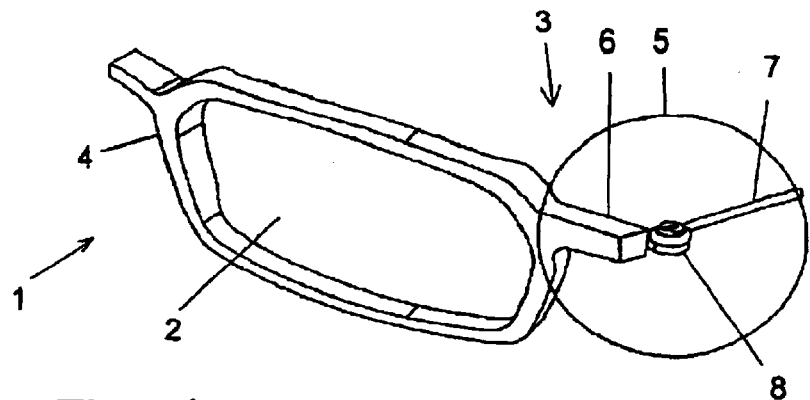
Firg. 1
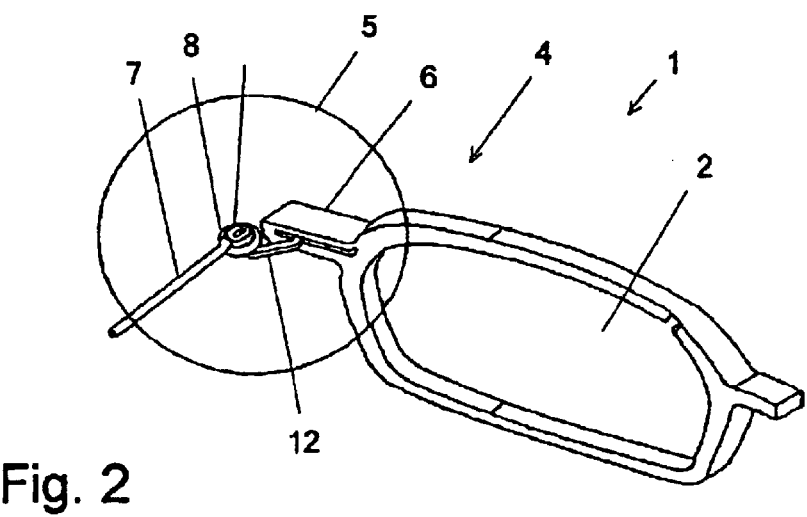
Fig. 2
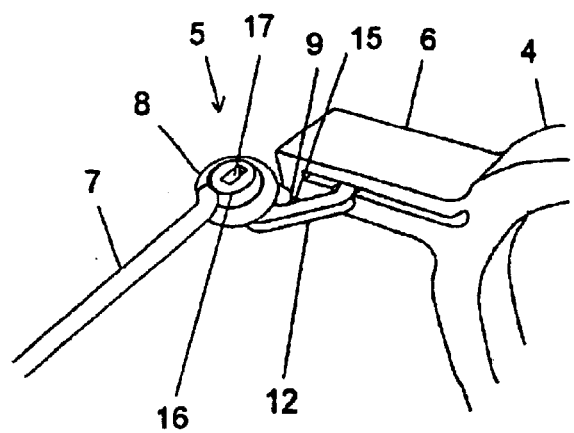
Fig. 3

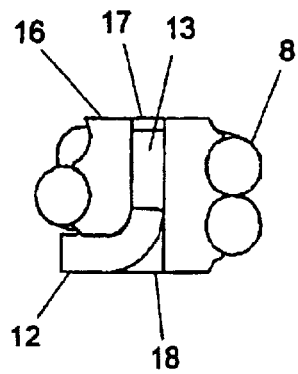
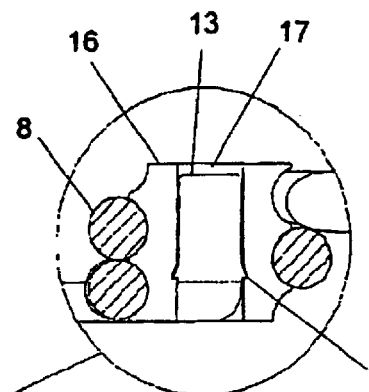
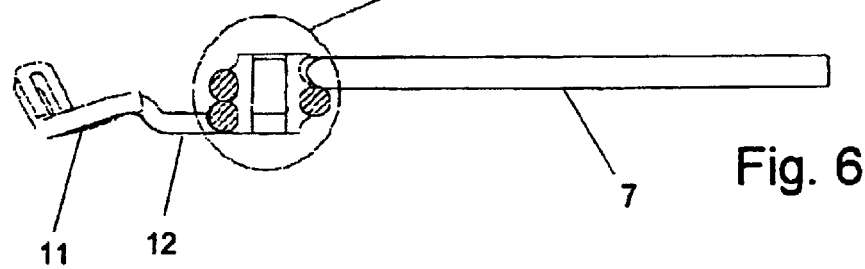
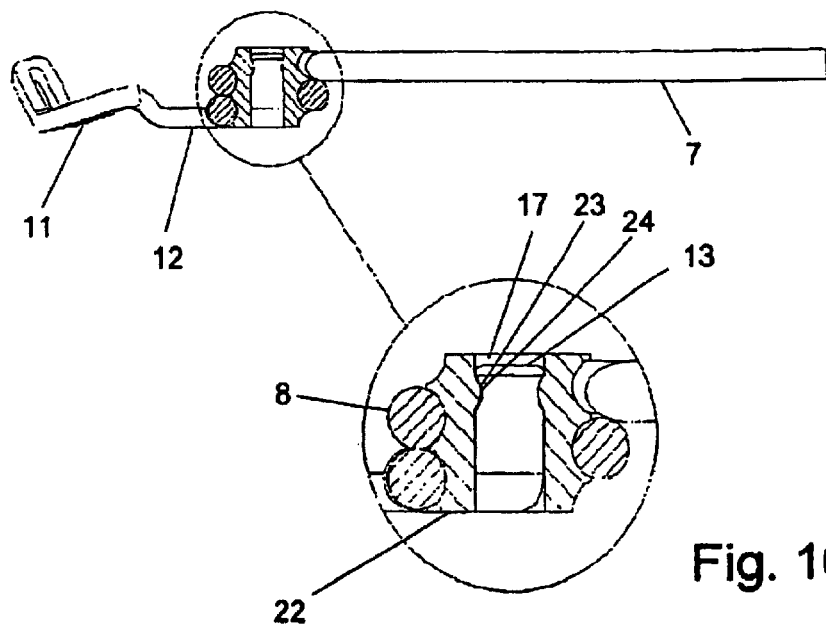

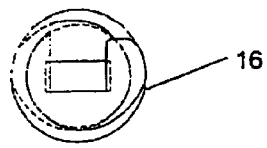
Fig. 11a
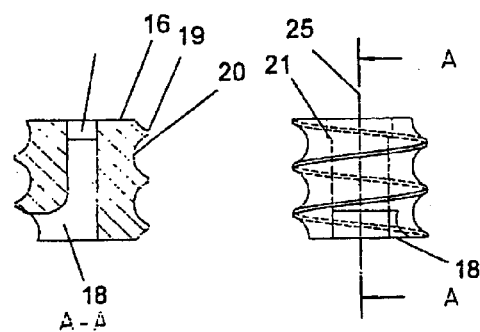
Fig. 11b    Fig. 11c    Fig. 11d    Fig. 11e
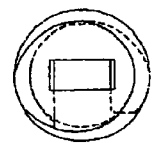
Fig. 11f
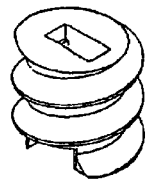
Fig. 11g
Fig. 11

EYEGLASS FRAME, A HINGE, AN EYEGLASS AND A METHOD OF MANUFACTURING A HINGE

This application claims the benefit of PCT Application No. PCT/DK01/00285 filed Apr. 27, 2001.

BACKGROUND OF THE INVENTION

The present invention relates to an eyeglass frame, a hinge for connecting a temple bar to an eyeglass frame, an eyeglass, and a method of manufacturing a hinge for linking a temple bar to an eyeglass frame. In particular the invention relates to eyeglass frames comprising hinges fitted with friction members.

As used herein the term eyeglass relates to the well known accessory which substantially comprises two lenses of glass or of other refractive or tinted, transparent material intended to be worn in front of the eyes of the user enabling him to obtain a corrected or a darkened view through the glasses, and a form of spectacle frame arranged to keep the lenses or glasses expediently fixed in the preferred position of use, where the user can look straight forward with both eyes and with parallel lines of sight through the respective lenses.

It is well known to provide such eyeglass frames with a frame front for holding the glasses and with a pair of temple bars for supporting the frame, which temple bars are connected to the frame front by means of hinges so as to allow the eyeglass to be folded up when not in use.

Even though a variety of eyeglasses are available, development is still taking place in order to find new solutions which might gain market shares, e.g. by offering particular features or cost benefits or through offering new aesthetic features.

U.S. Pat. No. Re 36 882 to Lindberg et al. discloses an eyeglass frame wherein the temple bar comprises a wire of which one end section has been wound into a coil for providing the exterior part of a hinge. The hinge pintle comprises a straight section of wire integral with the frame front. End sections of the pivot wire are angled laterally so as to provide double constraints for axial movement of the coil. This hinge design has proven successful, however, it is associated with some aesthetical and functional limitations. Thus, in this hinge the laterally angled sections of pintle wire protrude beyond the coil which may be undesirable. Both hinge parts comprise metal and thus the hinge operation involves metal rubbing against metal, a combination which gives rise to wear. Thus, it is not practically possible to make this hinge with a predetermined level of friction.

Due to the pitch in the coil the turning of the hinge is bound to be linked with some axial displacement, thus giving rise to wear between the lateral end portions of the pintle wire and adjacent portions of the coil. This rubbing gives rise to friction, however, on reversing the direction of pivoting this frictions vanishes due to play between the lateral pintle wire sections followed by restablishment of some degree of friction against the opposite one of the lateral pintle wire sections. Most often friction to turning of the temples vanishes quickly leading to a not very attractive tactile feel of the parts tending to be loose.

WO 97/23803 discloses an eyeglass with hinge means comprising double concentric coils of wire. Thus, a wide coil basically integral with the frame provides a female thread engaged by the exterior of a narrower coil integral with temple bar. This solution relies on wire rubbing against wire and does not permit establishing and maintaining any predetermined level of friction in the hinge.

WO 00/29896 discloses a hinge comprising coils in respect of each of the temples and of the frame front, which coils have generally similar diameter and pitch in order that they may engage about a common pin with interengaging windings. In this solution metal rubs against metal on turning the pivot with the likely result that friction will vary over time.

WO 98/40778 discloses a hinge for an eyeglass with coils in respect of each of the temple bars and the frame front. The coils are mutually similar and engaged about a common pin, one coil on top of the other. The pin comprises an enlarged head to provide axial restraint. In this coil metal rubs on metal with the likely result that friction may vary over time. On turning of the temple bar, there is bound to be axial movement and separation among the parts according to the pitch of the coil. This implies that the head of the pin must allow axial play. This does not create an optimum tactile feel. Further, the head of the pin bears on the top most winding of one of the coils with the danger that the coil may work its way past the head by the screwing action.

WO 99/21046 discloses a hinge for an eyeglass comprising a strip of metal wrapped about pivot inserts of friction material. The resilient strap of metal applies a radially directed biasing force on the friction member so as to eliminate any play in the hinge and to establish a controlled level of friction. Only with respect to the axial constraint there is the danger of metal rubbing against metal, however, the axial forces are virtually nil due to the absence of coils or other factors that might create axial displacement. This hinge is not integrated with wire components.

SUMMARY OF THE INVENTION

There is a desire to provide eyeglass hinges with a superior tactile feel, i.e. without any play, with a predetermined friction resistance on turning the pivot, which friction resistance should be completely unchanged over time, i.e. not affected by wear, or reversal of the motion, etc. There is a desire for such hinge means in association with eyeglass frames comprising wires. There is a desire for small and simple hinge means that permit easy adjustment of the attitude of the hinge axis in order to permit adapting the eyeglass frame so as to have the temple bars folded nicely together.

The invention in a first aspect provides an eyeglass frame as recited in claim 1.

This eyeglass frame offers pivoting of the temple bars with friction retention at all positions without localized wear of the hinge means by the biasing forces relied on for providing the friction. The biasing on the pivot eliminates any sense of play in the hinge means. The hinge ensures accurate guidance of the temple bar in all positions and thus creates a tactile feel of a high quality product. The hinge does not rely on protruding parts to axially constraint the motion and thus offers the designer all options of creating a design of his choice. The hinge may be implemented in a very small size and thus is unobtrusive in view.

The hinge body comprises a friction material, preferably one that cooperates well with the resilient wire.

The hinge body comprises a hollow member fitted about a hard core. This permits combining a comparatively soft exterior capable of adapting to the coil together with a sturdy core for structural quality.

The core comprises a strip of metal extending from the frame end while the coil comprises one or more windings of an end section of wire of the temple bar. This provides easy integration of the hinge components with the eyeglass frame and with temple bar and permits easy adjustment, e.g. for achieving proper hinge alignment.

According to a preferred embodiment an end face of the coil wire cooperates with an abutment to provide a constraint for turning of the pivot. This provides a positive definition of the end position while the coil serves to provide a controlled degree of resilience so as to soften the impact on the abutment and so as to provide a comfortable operation. Preferably the abutment restraints the outward motion of the temple bar. In the opposite direction, i.e. in folding the temple bar against the eyeglass frame rear side, no further abutment is required.

Preferably the threaded groove comprises at least one full revolution in order to allow a secure retention by the coil and in order to ensure equal distribution of the forces affecting the hinge body.

The invention in a second aspect provides a hinge as recited in claim 4. This hinge is simple in manufacturing and easily combines with various types of eyeglass frames, in particular eyeglass frames with wire temple bars. This hinge also achieves the advantages enumerated above.

Advantageous embodiments appear from the claims dependent from claim 4.

The invention in a third aspect provides an eyeglass as recited in claim 7. This provides an eyeglass with a high quality hinge that creates a high quality tactile feel and operation and that is completely stable in operation over long time spans. This eyeglass achieves the advantages enumerated above. Advantageous embodiments appear from the claims dependent from claim 7.

The invention in a fourth aspect provides a method of manufacturing a hinge according to claim 10. This provides a simple method of manufacturing a high quality hinge that easily integrates with the eyeglass frame front and with the temple bars. This method permits easy adaptation of hinge qualities such as a hinge attitude and friction retention.

Preferred embodiments of this method appear from the dependent method claims.

When fitting a hollow member about a hard core, the components should be matched to achieve a positive retention with no possibility of mutual rotation. This may be achieved by various methods known in the art such as by including resiliently tensioned elements and by providing barbs and cooperating recesses or by other means.

Further features and advantages of the invention will appear in further detail from the description of advantageous embodiments given below with reference to the drawings in which:

BRIEF DESCRIPTION OF THE DRAWINGS

FIG. 1 is an isometric view of part of an eyeglass as seen from the front,

FIG. 2 is an isometric view of part of an eyeglass as seen from the rear,

FIG. 3 is an enlargement of a detail from FIG. 1,

FIG. 6 is an axial section of the hinge components shown in FIG. 4, FIG. 7 is an enlargement of a detail from FIG. 6, FIG. 8 is a different axial section of the hinge components shown in FIG. 4, FIG. 9 is a view similar to FIG. 6 but showing an alternative embodiment of the hinge, FIG. 10 is an enlarged view of a detail from FIG. 8, and FIGS. 11a–11g depicts a component of the hinge in a set of views from all sides as well as in sections.

DETAILED DESCRIPTION OF THE PREFERRED EMBODIMENTS

Figure 4:
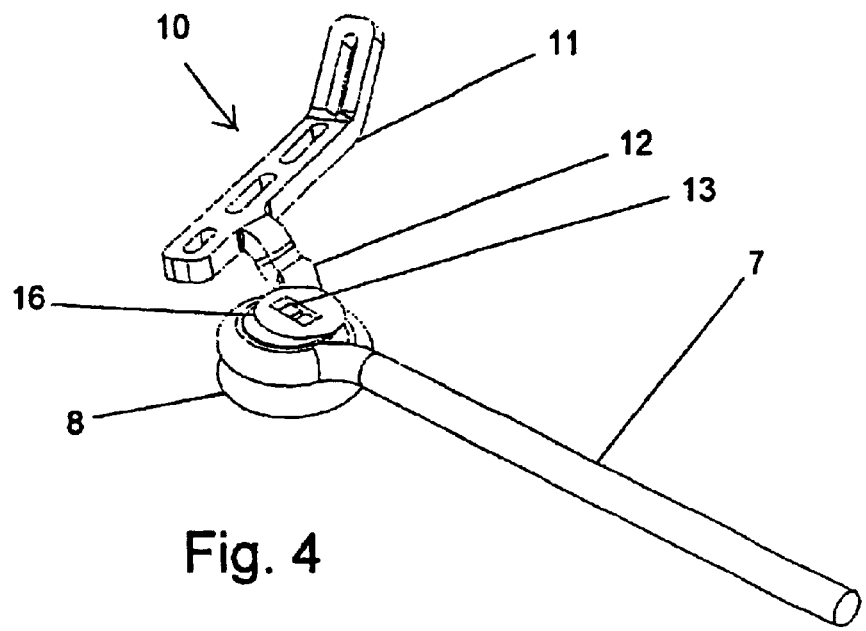
FIG. 4 is an isometric view of basic components of the hinge in assembled state.

All figures are schematic and not necessarily to scale and show only details essential for enabling those skilled in the art to practice the invention, while other details are omitted for the sake of clarity. In all figures the same references are used about identical or similar items.

Reference is first made to FIG. 1 which shows part of an eyeglass 1, said part basically comprising one glass 2, one hinge 5 and part of the eyeglass frame front 4 as well as part of the temple bar 7. The complete eyeglass 1 generally comprises frame 3 and glasses 2, the frame being constituted by frame front 4, temple bars 7 and hinges 5. The complete eyeglass has not been illustrated as the completion of the details shown and explained so as to implement the eyeglass is considered to lie wholly within the capabilities of those skilled in the art.

As may be seen in FIGS. 1, 2 and 3, the hinge 5 basically comprises temple coil 8, pivot core 13 and body or barrel 16.

In the embodiment shown in Figures the temple bar 7 comprises a piece of wire, of which an end section is wound into a coil 8. This coil interacts with the barrel 16 in order to permit swinging the temple bar from the open position ready to use as illustrated in the Figures and into the folded position where the temple bar is situated closely against the rear side of the eyeglass frame 3 as will be understood by those skilled in the art.

On swinging outward the temple bar 7, one coil end face 9 strikes on abutment 15 which provides a positive stop for the movement.

The coil winding of a resilient wire may be integrated with one of the frame front or the temple bar. The body with a threaded groove may be integral with the other one of the frame front or the temple bar.

The barrel 16 is fitted about pivot core 13 which is integral with a structural member referred to as the hinge base 10. Hinge base 10 is an elongated member connected to an extension 6 of the frame front 4 by any means as known to those skilled in the art, e.g. by gluing, casting, or press fitting.

Figure 5:
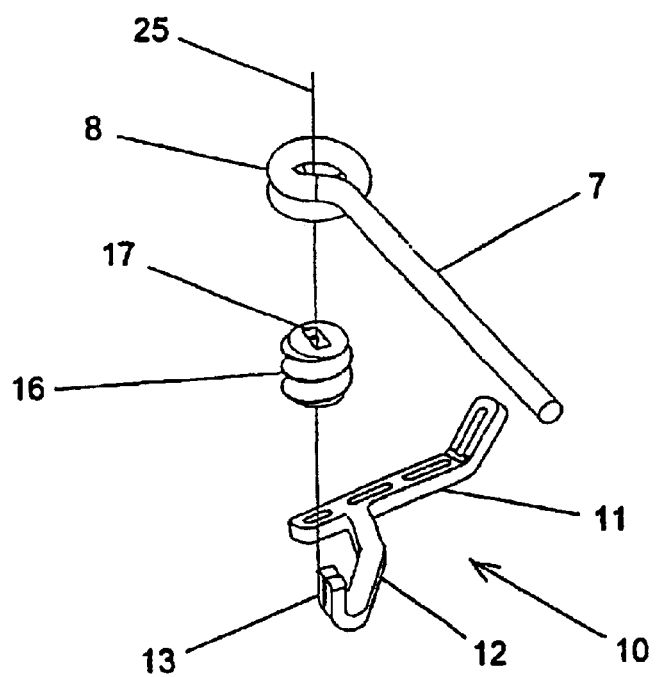
FIG. 5 is an exploded view of the components from FIG. 4.

Reference is now made to FIGS. 4 and 5 for an explanation of further details concerning the hinge and in particular concerning hinge base 10.

As will be evident from FIGS. 4 and 5, the hinge base 10 comprises a piece of material which as been cut and bent into the shape illustrated in FIGS. 4 and 5. The hinge base 10 comprises a lug 11 adapted for being integrated into the frame front entension (refer also to FIG. 3). The hinge base 10 further comprises arm 12 with an extension bent in order to provide the pivot core 13.

In order to assemble the parts, the barrel 16 is fitted about the pivot core 13, and the temple coil 8 is fitted about the barrel 16. As an alternative, the temple coil may be fitted about the barrel and the combination subsequently fitted about the pivot core. Fitting of the lug 11 into the frame front extension may be undertaken prior to the assembly of the hinge or subsequent to the assembly of the hinge as is considered convenient.

Reference is now made to FIG. 11 for a description of the barrel 16. FIG. 11 shows a barrel according to a first embodiment in views from above, from below, from the front, from the side, in sections with the lines A—A and B—B and in isometric view. As will appear the barrel basically comprises a member with an axial opening 17 and with an exterior thread comprising groove 19 and ridge 20. The groove 19 is rounded with a shape adapted to match the windings of the temple coil. The thread basically comprises about 2½ full revolutions. The thread defines axis 25 which is the hinge axis.

The axial opening 17 has a rectangular section. Adjacent the top the recess is widened to etablish ledges 21. In the barrel lower portion there is a rounded recess 18 to one side.

In other embodiments the axial opening 17 may have a uniform cross section outwardly, i.e. without the ledge 21.

Reference is now made to FIGS. 6 and 7 which illustrate a section through the hinge. Thus, these figures show barrel 16 fitted about pivot core 13 and supporting the temple coil 8.

In the embodiment shown in FIGS. 6 and 7, the pivot core 13 comprises barbs 14. On fitting the barrel on the pivot core these barbs form indentations in the barrel opening and thus provide retention of the barrel.

Prior to assembly the temple coil is wound to a diameter somewhat smaller than that of the barrel exterior in order that the temple coil is resiliently expanded on fitting the coil about the barrel. Thus the temple coil serves to secure the barrel against the pivot core and the barbs.

The resilient tension of the temple coil serves to ensure a good grip with no play in the hinge, with accurate control of the temple attitude in all directions and with a stable degree of friction resistance in turning the pivot.

As may be seen in FIGS. 6, 7 and 8 the pivot core 13 does not protrude above the barrel 16. At the hinge lower portion, the bend connecting the arm 12 with the pivot core 13 is completely concealed in the recess 18 in order that the lower side of the arm 12 is flush with the lower side of the barrel 16. Thus, the pivot components are virtually completely concealed by the temple coil.

In opening the temple bar 7 the temple coil end face 9 engages abutment 15 which basically is a face on the arm 12 (refer FIG. 3). Preferably these cooparating faces are both planar and oriented along the axis of the hinge. This provides the advantage that the temple coil end face rests solidly against the abutment with no bias tending to displace the temple coil end face from the abutment and thus no tendency to distort the components.

Preferably the temple wire comprises a titanium wire with round cross section. A titanium wire of a diameter of 1.1 mm has been found well suited. The hinge base 10 may comprise a piece of titanium that has been stamped and bent into the shape illustrated.

The barrel may comprise a hard polymer such as polyacetal with reinforcements of carbon fibres or glass fibres. Admixings of polytetraflour ethylene may be used for superior sliding properties. A polymer named RTP 881 TFE 10 DEL Acetal Homopolymer Carbon Fiber PTFE Lubricated from RTP Company, Winona, Minn. USA, has been found well suited. Other types of suitable materials are a polymer A3WC4 from BASF in germany or. RMKU 2-2511 from Bayer Corporation in Germany.

Reference is now made to FIGS. 9 and 10 for illustration of a barrel according to a second embodiment.

In the second embodiment the barrel 22 inside the axial opening 17 comprises an internal bead 23 adapted for cooperation with a neck 24 on the pivot core 13 so as to provide retention of the barrel on the pivot core. Other details are similar to those of the first embodiment.

Although specific embodiments have been explained above for the illucidation of the invention, these embodiments are in no way considered to limit the scope of the invention which may be varied in many ways by one skilled in the art within the scope of the appended claims.

What is claimed is:

1. An eyeglass frame apparatus comprising a frame front, a pair of temple bars, hinges for each temple bar pivotally connecting a respective temple bar with the frame front, each hinge comprising a coil winding of a resilient wire and a body with a threaded groove, the body comprising a hollow member fitted about a hard core comprising a strip of metal extending from a frame end, the body comprising material with frictional properties, the coil comprising a winding of an end section of the wire, and a pivot connection between the coil and the body enabling a pretensioned engagement of the coil with the body and providing a controlled friction resistance to turning of the pivot.

2. The apparatus of claim 1, wherein the coil winding with the resilient wire is integral with the frame front.

3. The apparatus of claim 1, wherein the coil winding with the resilient wire is integral with the temple bar.

4. The apparatus of claim 1, wherein the body with the threaded groove is integral with the frame front.

5. The apparatus of claim 1, wherein the body with the threaded groove is integral with the temple bar.

6. The apparatus of claim 1, further comprising an abutment and an end face of the coil wire cooperating with the abutment for constraining the turning of the pivot.

7. The apparatus of claim 1, wherein the threaded grove comprises at least one full revolution.

8. A hinge apparatus for connecting a temple bar to an eyeglass frame comprising a coil winding of a resilient wire integral with the temple bar, a body with a threaded groove integral with the frame front, the body comprising a hollow member fitted about a hard core comprising a strip of metal extending from a frame end, the body comprising material with friction properties, the coil comprising a winding of an end section of the wire of the temple bar, and a pivot connection be ween the coil and the body enabling a pretensioned engagement of the coil with the body for providing a pivotal connection with a controlled friction resistance to turning of the pivot.

9. The apparatus of claim 8, further comprising an abutment and an end face of the coil wire cooperating with the abutment for constraining the turning of the pivot.

10. The apparatus of claim 8, wherein the threaded groove comprises at least one full revolution.

11. An eyeglass apparatus comprising an eyeglass frame front, a pair of glasses mounted on said frame front, a pair of temple bars, a hinge for each temple bar pivotally connecting a respective temple bar with said frame front, the hinge comprising a coil winding of a resilient wire integral with the temple bar and a body with a threaded groove integral with the frame front, the body comprising a hollow member fitted about a hard core comprising a strip of metal extending from a frame end, the body comprising material with frictional properties, the coil comprising a winding of an end section of the wire of the temple bar, and a pivot connection between the coil and the body enabling a pretensioned engagement of the coil with the body for providing a pivotal connection with a controlled friction resistance to the turning of the pivot.

12. The apparatus of claim 11, further comprising an abutment and an end face of the coil wire cooperating with the abutment for constraining the turning of the pivot.

13. The apparatus of claim 11, wherein the threaded groove comprises at least one full revolution.

14. A method of manufacturing a hinge for linking a temple bar to a front of an eyeglass frame, comprising the steps of:

provided a coil winding of a resilient wire integral with the temple bar, providing a body with a threaded groove integral with the frame front, wherein the body comprises material having frictional properties, selecting for the body a hollow member and fitting the member about a hard core, selecting for the core a strip of metal extending from a frame end, providing the coil by winding an end section of the wire of the temple bar, fitting the coil in cooperating and pretensioned engagement with the body, and pivotally connecting the coil and the body with a controlled friction resistance to turning of the pivot.

15. The method of claim 14, further comprising providing an abutment, engaging an end face of the coil wire with the abutment, and constraining the turning of pivot.

16. The method of claim 14, further comprising providing at least one full revolution of the threaded groove.

* * * * *